United States Patent
Wada et al.

(10) Patent No.: US 7,968,143 B2
(45) Date of Patent: Jun. 28, 2011

(54) METHOD FOR MANUFACTURING POLARIZING FILM, POLARIZING FILM OBTAINED BY THE METHOD, AND IMAGE DISPLAY APPARATUS USING THE POLARIZING FILM

(75) Inventors: Morimasa Wada, Osaka (JP); Tadayuki Kameyama, Osaka (JP); Hiroaki Mizushima, Osaka (JP); Naoki Tomoguchi, Osaka (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 1001 days.

(21) Appl. No.: 10/585,511

(22) PCT Filed: Mar. 29, 2005

(86) PCT No.: PCT/JP2005/005823
§ 371 (c)(1),
(2), (4) Date: Jul. 10, 2006

(87) PCT Pub. No.: WO2005/096040
PCT Pub. Date: Oct. 13, 2005

(65) Prior Publication Data
US 2009/0147359 A1 Jun. 11, 2009

(30) Foreign Application Priority Data
Mar. 31, 2004 (JP) ................. 2004-102314

(51) Int. Cl.
*B05D 3/12* (2006.01)
*B21F 9/00* (2006.01)
*C09J 7/02* (2006.01)
*B29D 7/01* (2006.01)

(52) U.S. Cl. ..................... 427/171; 264/1.34

(58) Field of Classification Search .................. 427/171; 264/1.34; 359/490
See application file for complete search history.

(56) References Cited

U.S. PATENT DOCUMENTS

| 5,071,906 A | * | 12/1991 | Tanaka et al. ................. 524/557 |
| 5,523,863 A | | 6/1996 | Fergason |
| 6,049,428 A | | 4/2000 | Khan et al. |
| 6,600,529 B1 | | 7/2003 | Kusumoto et al. |

(Continued)

FOREIGN PATENT DOCUMENTS
EP    1 160 591    12/2001

(Continued)

OTHER PUBLICATIONS

International Search Report of PCT/JP2005/005823, date of mailing Jun. 14, 2005.

*Primary Examiner* — Frederick J Parker
*Assistant Examiner* — Michael Wieczorek
(74) *Attorney, Agent, or Firm* — Westerman, Hattori, Daniels & Adrian, LLP

(57) ABSTRACT

The present invention provides a method for manufacturing a polarizing film, by which, even when a wide raw film is used, it is possible to obtain a polarizing film that achieves excellent optical characteristics as well as uniformity in in-plane optical characteristics. The method includes the steps of dyeing a polymer film; stretching the dyed film; and drying the film that has undergone the dyeing and stretching steps while conveying the film with rolls. In the drying step, at least two rolls are used as the rolls and the film is dried under a condition that a ratio (R/W) of a distance (R) between the adjacent rolls to an initial width (W) of the polymer film is not less than 0.5 and not more than 4.0.

7 Claims, 2 Drawing Sheets

U.S. PATENT DOCUMENTS

| | | | |
|---|---|---|---|
| 2002/0015807 A1* | 2/2002 | Sugino et al. | 428/1.31 |
| 2002/0182427 A1* | 12/2002 | Kondo et al. | 428/522 |
| 2003/0062645 A1* | 4/2003 | Nishida et al. | 264/78 |

FOREIGN PATENT DOCUMENTS

| | | |
|---|---|---|
| JP | 3-503322 A | 7/1991 |
| JP | 2001-343529 A | 12/2001 |
| JP | 2002-40247 A | 2/2002 |
| JP | 2002-40255 A | 2/2002 |
| JP | 2002-40256 A | 2/2002 |
| JP | 2002-267844 A | 9/2002 |
| JP | 2002-311240 A | 10/2002 |
| JP | 2002-326278 A | 11/2002 |
| WO | WO 90/04805 A1 | 5/1990 |

\* cited by examiner

METHOD FOR MANUFACTURING POLARIZING FILM, POLARIZING FILM OBTAINED BY THE METHOD, AND IMAGE DISPLAY APPARATUS USING THE POLARIZING FILM

TECHNICAL FIELD

The present invention relates to a method for manufacturing a polarizing film to be used in, for example, an image display apparatus such as a liquid crystal display, an electroluminescence (EL) display, a plasma display (PD), and a field emission display (FED), and among others especially in a liquid crystal display. The present invention further relates to a polarizing film obtained by this manufacturing method. Still further, the present invention relates to an optical film using the polarizing film and to an image display apparatus including the polarizing film or the optical film.

BACKGROUND ART

A polarizing film to be used in an image display apparatus (e.g., a liquid crystal display) needs to achieve a high transmittance and a high polarization degree in order to provide bright images with excellent color reproducibility. Conventionally, such a polarizing film is manufactured by aligning a dichroic substance such as iodine that is dichroic or a dichroic dye in a polyvinyl alcohol (PVA)-based polymer film.

In recent years, with an increase in size and improvement in function and brightness of liquid crystal displays, it has been required that polarizing plates to be used therein also are increased in size and improved in optical characteristics (such as neutrality and a polarization degree) and in-plane uniformity. However, in order to obtain a large polarizing plate, it is necessary to perform uniform uniaxial stretching with respect to a wide raw film. However, as the width of the raw film increases, it becomes more difficult to stretch the film uniformly. In fact, uniform stretching is a very difficult treatment, so that, when a wide raw film is used, the resultant polarizing film tends to exhibit degraded in-plane uniformity and optical characteristics. If the in-plane optical characteristics are not uniform, there arises a problem in that display irregularity will occur when the polarizing plate is used to form an image display apparatus. In order to solve this problem, reducing the distance between rolls used for stretching in dry stretching methods has been proposed (see Patent Document 1, for example). However, this cannot solve the problem sufficiently.

Patent Document 1: JP 2002-326278 A

DISCLOSURE OF INVENTION

Problem to be Solved by the Invention

It is an object of the present invention to provide a method for manufacturing a polarizing film, by which, even when a wide raw film is used, it is possible to obtain a polarizing film that achieves excellent optical characteristics as well as uniformity in in-plane optical characteristics. It is another object of the present invention to provide a polarizing film obtained by this manufacturing method, an optical film using the polarizing film, and an image display apparatus using the polarizing film or the optical film.

Means for Solving Problem

In order to achieve the above object, the present invention provides a method for manufacturing a polarizing film, including the steps of: dyeing a polymer film; stretching the dyed film; and drying the film that has undergone the dyeing and stretching steps while conveying the film with rolls. In the drying step, at least two rolls are used as the rolls and the film is dried under a condition that a ratio (R/W) of a distance (R) between the adjacent rolls to an initial width (W) of the polymer film is not less than 0.5 and not more than 4.0.

A polarizing film according to the present invention is a polarizing film obtained by the manufacturing method according to the present invention.

An optical film according to the present invention is an optical film including the polarizing film according to the present invention and at least one optical layer laminated on the polarizing film.

An image display apparatus according to the present invention is an image display apparatus including the polarizing film according to the present invention or the optical film according to the present invention.

Effects of the Invention

According to the manufacturing method of the present invention, regardless of the width of a raw film (a polymer film), it is possible to obtain a polarizing film that achieves excellent optical characteristics such as polarization degree and also uniformity in in-plane optical characteristics. The polarizing film obtained by the manufacturing method of the present invention does not cause display irregularity even when it is large. Thus, by using this polarizing film, it is possible to provide a large image display apparatus with excellent display characteristics.

Figure 1:
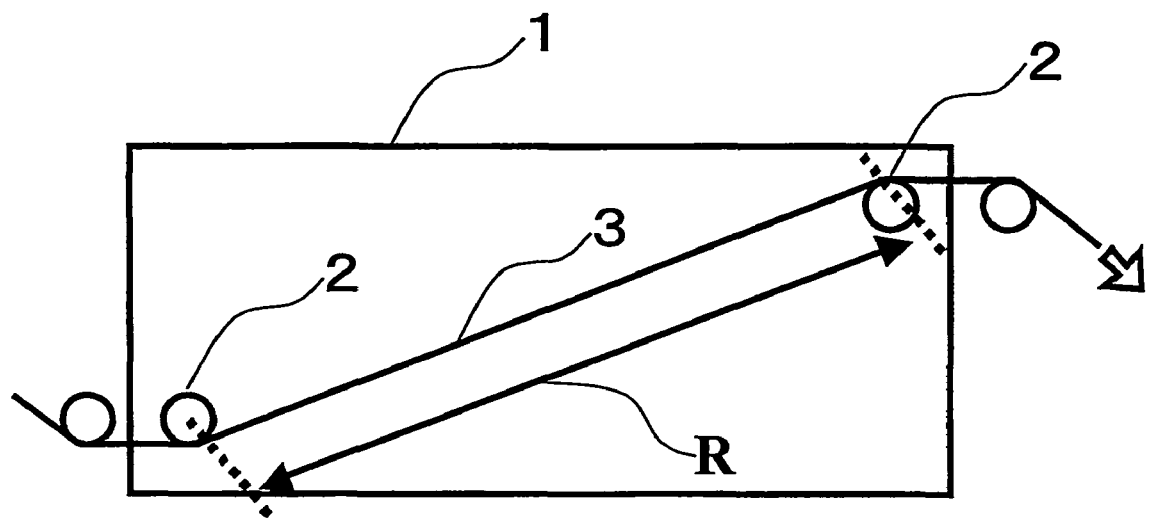
FIG. 1 is a schematic view illustrating how a film is conveyed in a drying apparatus in one example of the present invention.

EXPLANATION OF REFERENCE NUMERALS 1 drying apparatus
2 roll
3 polarizing film
R distance between rolls

DESCRIPTION OF THE INVENTION

Hereinafter, the present invention will be described in detail.

As described above, in the method for manufacturing a polarizing film according to the present invention, the drying treatment performed subsequent to the dyeing and stretching treatments is carried out under a condition that the ratio (R/W) of the distance (R) between rolls to the initial width (W) of the polymer film is not less than 0.5 and not more than 4.0. When the value of R/W is less than 0.5, the resultant polarizing film exhibits low uniaxial alignment so that the desired optical characteristics such as a polarization degree cannot be obtained. On the other hand, when the value of R/W is more than 4.0, adjustment of a tensile force becomes difficult, so that conveying the film in the drying step becomes very difficult. Thus, the method becomes impractical because the quality of the film becomes unstable. Since the value of R/W preferably is larger as long as the film can be conveyed, it is more preferable that R/W is not less than 1.0 and not more than 4.0, and it is particularly preferable R/W is not less than 2.0 and not more than 4.0. The reason why uniform in-plane optical characteristics are obtained by setting the value of R/W to fall within the predetermined range presumably is as follows. By setting the distance R to be long, factors that may hinder behaviors of size and physical properties during the drying treatment can be minimized.

In the present invention, the distance (R) between rolls means, for example, in a drying apparatus 1 shown in the schematic view of FIG. 1, a distance R between rolls 2 for supporting or stretching a polymer film 3 as measured from a contact portion of the film 3 with one of the rolls 2 to a contact portion of the film 3 with the other roll 2. In the present invention, it is preferable that the film 3 is not in contact with any members between the rolls. Thus, when stretching the film in the width direction is necessary, it is preferable that the film is stretched using a roll that can stretch the film in the width direction, such as an expander roll. Furthermore, in the present invention, the initial width (W) of the polymer film means the width of a raw film that is not yet subjected to the manufacturing process.

Figure 2:
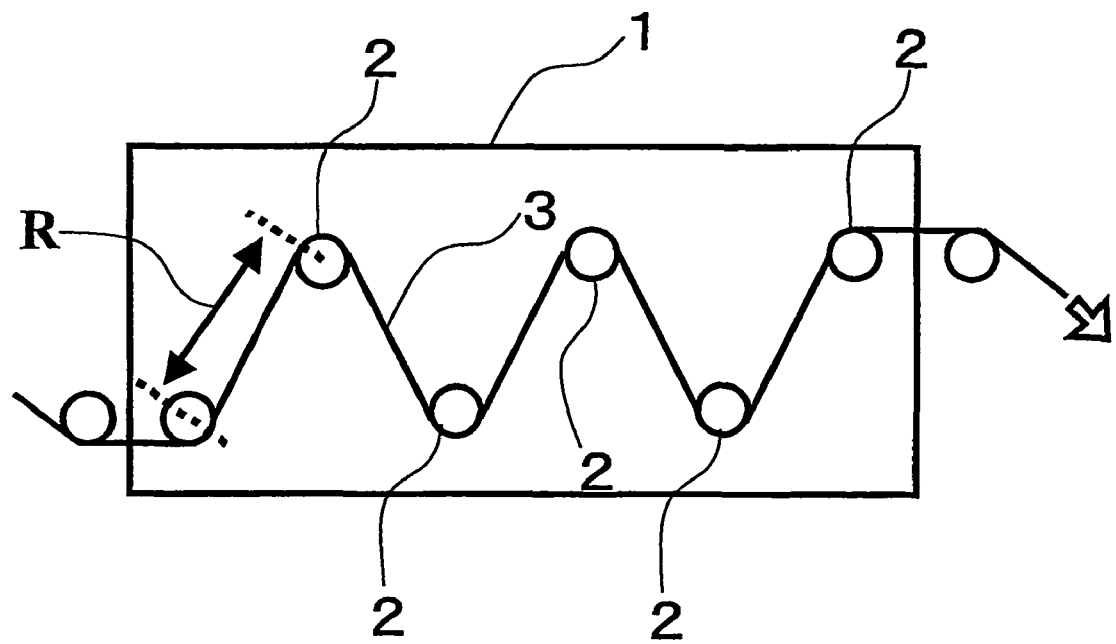
FIG. 2 is a schematic view illustrating how a film is conveyed in a drying apparatus in another example of the present invention.
Figure 3:
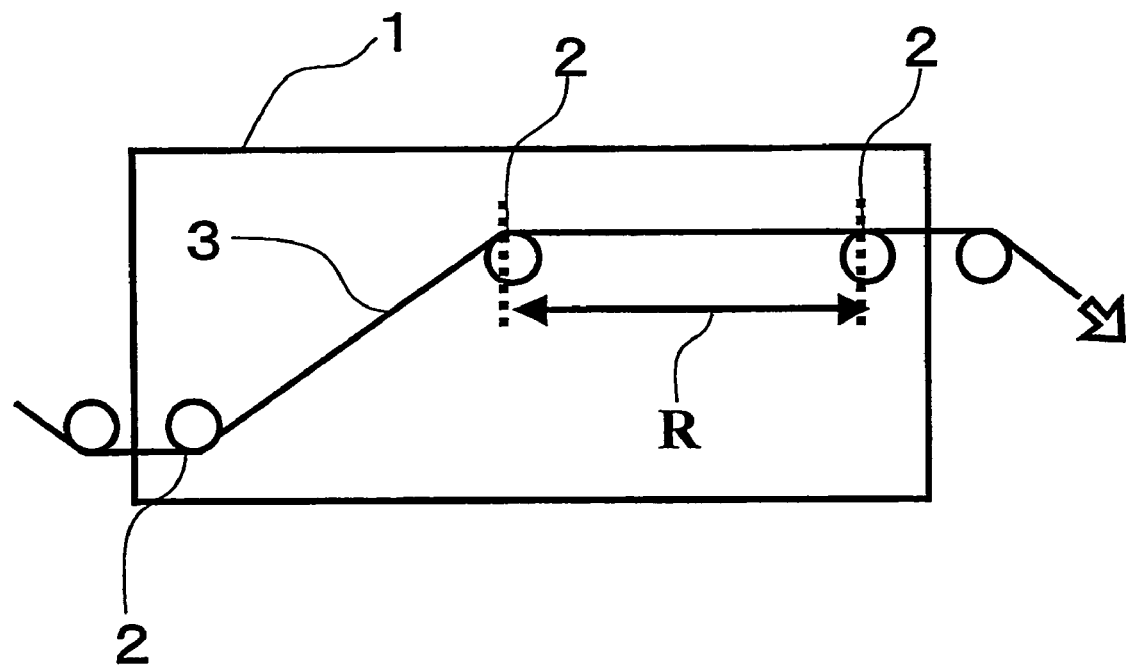
FIG. 3 is a schematic view illustrating how a film is conveyed in a drying apparatus in still another example of the present invention.

In the present invention, the distance (R) between the rolls and the initial width (W) of the polymer film specifically are as follows, for example: when W is in the range from 1800 to 3200 mm, R is in the range from 900 to 12800 mm; preferably, when W is in the range from 2000 to 3000 mm, R is in the range from 1000 to 12000 mm; and more preferably, when W is in the range from 2200 to 2800 mm, R is in the range from 1100 to 11200 mm. In the drying step of the manufacturing method according to the present invention, it is preferable that in the drying step, three or more rolls are used as the rolls, and the above-described condition is satisfied where the distance (R) denotes a distance between at least one pair of the adjacent rolls selected from the three or more rolls. For example, as shown in the schematic view of FIG. 2, when a drying apparatus 1 has three or more rolls 2 (six rolls in FIG. 2), there are a plurality of pairs of adjacent rolls (five pairs in FIG. 2). In this case, the distance (R) between at least one of the pairs of adjacent rolls should be set so that R/W is not less than 0.5 and not more than 4.0. Furthermore, when a drying apparatus 1 has three rolls 2 as shown in the schematic view of FIG. 3, there also are a plurality of pairs of adjacent rolls (two pairs in FIG. 3). In this case as well, the distance (R) between at least one of the pairs of adjacent rolls should be set so that R/W is not less than 0.5 and not more than 4.0. It is to be noted here that, when there are three or more rolls and there are a plurality of pairs of adjacent rolls, R/W may be the same or different between the respective pairs of adjacent rolls.

In the manufacturing method of the present invention, it is preferable that, in the drying step, at least 50%, more preferably at least 75% of the film is dried under the above-described condition.

In the drying step of the manufacturing method according to the present invention, it is preferable that the film is conveyed with a tensile force being applied thereto from the aspect of slack prevention etc. The tensile force may be such that, for example, it causes the film to be stretched to about 1.0 to 1.3 times. Such a tensile force can be obtained by setting the respective rolls to have different peripheral velocities.

The type of the polymer film (raw film) is not particularly limited, and various types of polymer films can be used. Examples of the polymer film include: hydrophilic polymer films such as PVA-based films, partially-formalized PVA-based films, polyethylene terephthalate (PET)-based films, ethylene-vinyl acetate copolymer-based films, films obtained by partially saponifying these films, and cellulose-based films; and polyene-based alignment films of dehydrated PVA, dehydrochlorinated polyvinyl chloride, and the like. Among these, it is preferable to use PVA-based films and partially-formalized PVA-based films because they have excellent dye-affinity with respect to dichroic substances such as iodine.

The polymer composing the polymer film has a polymerization degree of, for example, in the range from 500 to 10,000, preferably from 100 to 6000, and more preferably from 1400 to 4000. As for a saponified film, it is preferable that the saponification degree is at least 75 mol %, more preferably at least 98 mol %, and particularly preferably in the range from 98.3 to 99.8 mol % in light of the solubility in water.

When a PVA-based film is used as the polymer film, the PVA-based film can be formed by an appropriate method such as a flow-expanding method for forming a film by flow-expanding a raw material dissolved in water or an organic solvent, a casting method, or an extrusion method. Preferably, the PVA-based film has a retardation value of 5 nm to 100 nm. Moreover, in order to obtain a polarizing film with uniform in-plane optical characteristics, it is preferable that variation in in-plane retardation of the PVA-based film is as small as possible. The variation in in-plane retardation of the PVA-based film as an initial raw film preferably is 10 nm or less, more preferably 5 nm or less, at the measurement wavelength of 1000 nm.

The polarizing film according to the present invention preferably has a single transmittance (the transmittance measured with respect to the polarizing film alone) of at least 43%, more preferably in the range from 43.3% to 45.0%. On the other hand, it is preferable that the crossed transmittance (the transmittance measured in the state where two polarizing films that are the same as the above polarizing film are laminated so that their absorption axes meet at an angle of 90°) is as small as possible. In practice, the crossed transmittance preferably is not less than 0.00% and not more than 0.050%, more preferably not less than 0.00% and not more than 0.030%. Data concerning the in-plane uniformity of the polarizing film can be obtained by measuring crossed transmittances of samples of the polarizing film taken from a plurality of points in a plane of the polarizing film at a measurement wavelength of 440 nm and then determining the standard deviation thereof. In the present invention, it is preferable that the standard deviation is less than 0.100, more preferably less than 0.060. Furthermore, in the present invention, it is preferable that the polarization degree is not less than 99.90% and not more than 100%, particularly preferably not less than 99.95% and not more than 100% from the aspect of practical use. The transmittance and the polarization degree can be measured by, for example, methods specified in Examples described below.

Generally, a dry stretching method or a wet stretching method is used as a method for manufacturing the polarizing film. However, in the present invention, a wet stretching method preferably is used. When the polarizing film is manufactured by a wet stretching method, any suitable wet stretching method can be used depending on the conditions. For example, a method including a series of treatment steps of swelling, dyeing, crosslinking, stretching, washing, and drying a polymer film as an initial raw film generally is used, for example. It is preferable that each of the treatment steps other than the drying treatment step is carried out with the polymer film being immersed in a bath containing a treatment solution corresponding to each treatment step. It is to be noted here that the order of performing the swelling, dyeing, crosslinking, stretching, washing and drying treatments, the number of times each of the treatments is performed, and whether or not each of the treatments is performed are not particularly limited, as long as the drying treatment step is performed after the dyeing and stretching treatment steps. Some of the treatments can be performed at the same time as a single treatment step, and some of the treatments can be omitted. For example, the stretching treatment can be performed after the dyeing treatment, or alternatively, it can be performed simultaneously with the swelling treatment or the dyeing treatment. Also, it is possible to perform the dyeing treatment after the stretching treatment. Furthermore, it is preferable to perform the crosslinking treatment before or after the stretching treatment. There is no limitation on the stretching treatment, and it can be carried out by any suitable manners. For example, when a roll stretching method is used, the stretching is achieved by utilizing the difference in peripheral velocity between rolls. Moreover, in the respective treatments, an additive such as boric acid, borax, or potassium iodide can be used as appropriate. Accordingly, the polarizing film of the present invention may contain boric acid, zinc sulfate, zinc chloride, potassium iodide, or the like, as necessary. Furthermore, in some of these treatments, the polymer film may be stretched in the direction along which the film is conveyed (the MD direction or the longitudinal direction of the film) or the width direction (the TD direction or the width direction of the film) as appropriate. The washing treatment may be performed after each of the treatments.

In the swelling treatment step, the film is immersed in a swelling bath filled with water, for example. The polymer film is washed with water, whereby dirt and an anti-blocking agent on the surface of polymer film can be removed. Moreover, the polymer film is swollen, which is expected to bring about an effect of preventing the occurrence of the non-uniformity such as unevenness in dyeing. To this swelling bath, glycerin, potassium iodide, or the like may be added as appropriate. Preferably, glycerin is added so that its concentration becomes 5 wt % or less and potassium iodide is added so that its concentration becomes 10 wt % or less. The temperature of the swelling bath preferably is in the range from 20° C. to 45° C., more preferably from 25° C. to 40° C. The immersion time in the swelling bath preferably is in the range of 2 to for 180 seconds, more preferably from 10 to 150 seconds, and particularly preferably from 60 to 120 seconds. The polymer film may be stretched in this swelling bath, and in this case, the stretch ratio is about 1.1 to 3.5.

In the dyeing treatment step, the polymer film is immersed in a dye bath containing a dichroic substance such as iodine, thereby allowing the polymer film to adsorb the dichroic substance, for example.

As the dichroic substance, it is possible to use a conventionally known substance such as iodine and an organic dye, for example. Examples of the organic dye include Red BR, Red LR, Red R, Pink LB, Rubine BL, Bordeaux GS, Sky blue LG, Lemon yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo red, Brilliant violet BK, Suprablue G, Suprablue GL, Supraorange GL, Direct sky blue, Direct first orange S, and First black.

These dichroic substances can be used alone or in combination of at least two kinds thereof. When using the organic dye, it is preferable to use two or more kinds of organic dyes in combination in order to attain neutralization of the film in the visible light region. Specific examples of the combination of organic dyes include combinations of Congo red and Suprablue G, Supraorange GL and Direct sky blue, and Direct sky blue and First black.

The solution contained in the dye bath can be prepared by dissolving the dichroic substance in a solvent. Water generally is used as the solvent, but the solvent may further contain an organic solvent compatible with water. The concentration of the dichroic substance in the solution preferably is in the range from 0.010 to 10 wt %, more preferably from 0.020 to 7 wt %, and particularly preferably from 0.025 to 5 wt %.

When iodine is used for the dichroic substance, it is preferable to further add an iodide because this allows further improvement in dyeing efficiency. Examples of the iodide include potassium iodide, lithium iodide, sodium iodide, zinc iodide, aluminum iodide, lead iodide, copper iodide, barium iodide, calcium iodide, tin iodide, and titanium iodide. Any of these iodides preferably is added to the dye bath so that its concentration falls in the range from 0.010 to 10 wt %, more preferably from 0.10 to 5 wt %. Among these, it is preferable to add potassium iodide, and the ratio between iodine and potassium iodide (the weight ratio, iodine:potassium iodide) preferably is in the range from 1:5 to 1:100, more preferably from 1:6 to 1:80, and particularly preferably 1:7 to 1:70. Furthermore, in order to improve the in-plane uniformity of the film, a crosslinking agent such as a boron compound may be added as appropriate.

Though the time for immersing the polymer film in the dye bath is not particularly limited, it preferably is in the range from 1 to 20 minutes, more preferably from 2 to 10 minutes. The temperature of the dye bath preferably is in the range from 5° C. to 42° C., more preferably from 10° C. to 35° C. The polymer film may be stretched in this dye bath, and in this case, the stretch ratio is about 1.1 to 3.5, for example.

The dyeing treatment is not limited to the above-described immersion in the dye bath. The dyeing treatment also can be carried out by, for example, applying or spraying an aqueous solution containing a dichroic substance onto the polymer film. Alternatively, a dichroic substance may be mixed in a material of the polymer film before forming the polymer film.

In the crosslinking treatment step, the polymer film is immersed in a bath containing a crosslinking agent to cause crosslinking, for example. A conventionally known substance can be used as the crosslinking agent. Examples of the crosslinking agent include boron compounds such as boric acid and borax, glyoxal, and glutaraldehyde. They may be used alone or in combination of at least two kinds thereof. When two or more kinds of crosslinking agents are used in combination, the combination of boric acid and borax is preferable, and the ratio between boric acid and borax (molar ratio, boric acid:borax) preferably is in the range from 4:6 to 9:1, more preferably from 5.5:4.5 to 7:3, and most preferably 6:4.

The solution contained in the crosslinking bath can be prepared by dissolving the crosslinking agent in a solvent. The solvent can be water, for example, and it may further contain an organic solvent compatible with water. The concentration of the crosslinking agent in the solution is not particularly limited, but it preferably is in the range from 1 to 10 wt %, more preferably from 2 to 6 wt %.

An iodide may be added to the crosslinking bath, because this contributes to the uniformity in in-plane characteristics of the polarizing film. Examples of the iodide include potassium iodide, lithium iodide, sodium iodide, zinc iodide, aluminum iodide, lead iodide, copper iodide, barium iodide, calcium iodide, tin iodide, and titanium iodide. The content of the iodide is 0.05 to 15 wt %, more preferably 0.5 to 8 wt %. Among these, the combination of boric acid and potassium iodide is preferable, and the ratio between boric acid and potassium iodide (weight ratio, boric acid: potassium iodide) preferably is in the range from 1:0.1 to 1:3.5, more preferable from 1:0.5 to 1:2.5.

The temperature of the crosslinking bath is, for example, in the range from 20° C. to 70° C., and time for immersing the polymer film is, for example, in the range from 1 second to 15 minutes, preferably from 5 seconds to 10 minutes. Furthermore, the crosslinking treatment can be performed by applying or spraying a solution containing the crosslinking agent, as in the case of the dyeing treatment. The polymer film may be stretched in this crosslinking bath, and in this case, the stretch ratio is about 1.1 to 3.5, for example.

In the stretching treatment step, for example, when a wet stretching method is used, the polymer film is stretched to 2 to 7 times its original length while being immersed in a bath. Note here that the stretch ratio is not particularly limited.

The solution contained in the stretching bath is not particularly limited. For example, a solution containing any of various metal salts, iodine compounds, boron compounds, and zinc compounds can be used as the solution in the stretching bath. As the solvent of this solution, a solvent selected from water, ethanol, and various organic solvents can be used as appropriate. Among these, it is preferable to use a solution containing about 2 to 18 wt % of boric acid and/or about 2 to 18 wt % of potassium iodide. When boric acid and potassium iodide are used together, it is preferable that they are present in the solution at a ratio (a weight ratio, boric acid:potassium iodide) approximately in the range from 1:0.1 to 1:4, more preferably from 1:0.5 to 1:3.

The temperature of the stretching bath preferably is in the range from 40° C. to 67° C., more preferably from 50° C. to 62° C., for example. In the washing treatment step, the polymer film is immersed in a washing bath containing an aqueous solution, for example. By this treatment step, unnecessary residues such as the boric acid bonded to the polymer film through the treatments performed prior to the washing treatment can be removed. The aqueous solution may contain an iodide. As the iodide, sodium iodide or potassium iodide can be used preferably, for example. When potassium iodide is added to the washing bath, the concentration thereof is, for example, 0.1 to 10 wt %, preferably 3 to 8 wt %. Furthermore, the temperature of the washing bath preferably is 10° C. to 60° C., more preferably 15° C. to 40° C. Furthermore, the number of times the washing treatment is performed is not particularly limited. The washing treatment may be performed only once or a plurality of times. When performing the washing treatment a plurality of times, the type and/or the concentration of the additive in the washing bath may be changed each time.

When taking the polymer film out of each treatment bath, a conventionally known draining roll such as a pinch roll can be used to prevent the dripping of the solution. Alternatively, excessive solution can be removed by using an air knife.

As described above, it is possible to carry out a stretching treatment in some of the treatment steps other than the stretching treatment step. In the treatment steps including the stretching treatment, setting the ratio (L/W) of the stretching distance (L) to the width (W) of the initial raw film (the form of the polymer film at an initial stage) to be not less than 0.5 and not more than 30 is effective for the improvement of the uniaxial alignment property, but the ratio (L/W) is not limited thereto. When the stretching treatment is performed in the plural treatment steps, the above-described effect can be produced when the above condition is satisfied in at least one of the treatment steps. However, it is particularly preferable that the above condition is satisfied in all the treatment steps including the stretching treatment. Moreover, the value of L/W in the plural treatment steps may vary from one treatment step to another, and the value of L/W in each treatment step can be determined as appropriate depending on the treatment condition. Note here that the stretching distance (L) means a distance between portions on which a force necessary for stretching is applied. For example, in the case of roll stretching, the stretching distance (L) is a distance between two rolls used for stretching, measured as a length of a straight line connecting the centers of the cross sections of these rolls. The width (W) of the initial raw film is the width of the raw film that is not yet subjected to the series of polarizing film manufacturing steps.

When the value of L/W is less than 0.5, the uniaxial alignment property becomes low so that the required optical characteristics cannot be obtained. On the other hand, when the value of L/W is more than 30, a very large stretching bath is required, which renders the method impractical. It is preferable that the value of L/W is not less than 0.5 and not more than 15, more preferably not less than 1 and not more than 13, and particularly preferably not less than 2 and not more than 12.

In the drying treatment step, as long as the ratio (R/W) of the distance (R) between the rolls to the initial width (W) of the raw film is less than 0.5 and not more than 4.0 as described above, other conditions can be determined as appropriate. In general, natural drying, air drying, heat drying, etc. can be used as a method of drying the polymer film. Usually, heat drying is preferably used. In the heat drying, it is preferable that the heating temperature is about 20° C. to 80° C. and the drying time is 1 to 10 minutes, for example. Also in this drying treatment step, the polymer film can be stretched as appropriate.

It is preferable that the final stretch ratio (the total stretch ratio) of the polarizing film obtained through the above-described respective treatment steps is in the range from 3.0 to 7.0, more preferably from 5.5 to 6.2, with respect to the polymer film before being subjected to the respective treatments (i.e., the raw film). When the total stretch ratio is less than 3.0, it is difficult to obtain a polarizing film having a high polarization degree. On the other hand, when the total stretch ratio is more than 7.0, fracture of the film is liable to occur.

The method of forming the polarizing film is not limited to the above-described exemplary method but other methods also can be used, as long as they are within the scope of the manufacturing method the present invention. For example, the polarizing film can be formed by using a dry stretching method or by mixing a dichroic substance in a polymer film formed of polyethylene terephthalate (PET) or the like, forming a film using it, and then stretching the film. Furthermore, an O-type polarizing film can be formed by using a dichroic dye as a guest in a uniaxially-aligned liquid crystal as a host (U.S. Pat. No. 5,523,863 and JP 3 (1991)-503322 A), and also an E-type polarizing film can be formed by using a dichroic lyotropic liquid crystal etc. (U.S. Pat. No. 6,049,428). In these cases, a drying treatment to which the present invention is applied is not limited to a final drying treatment of the polarizing film but can be applied to any drying treatment performed after the dyeing and stretching treatment steps. The present invention also can be applied when drying is required in the middle of the treatment steps.

The thickness of the thus-formed polarizing film is not particularly limited, but is, for example, 5 to 80 μm, preferably 5 to 40 μm. When the thickness of the polarizing film is 5 μm or larger, the mechanical strength of the polarizing film is not degraded. On the other hand, when the thickness of the polarizing film is 80 μm or smaller, the optical characteristics of the polarizing film are not degraded and a thin image display apparatus can be realized when the polarizing film is used therein. In the polarizing film of the present invention, it is preferable that the polarizing film has a polarization degree of at least 99.90%.

At the time of an actual use of the polarizing film of the present invention, various optical layers can laminated thereon. There is no particular limitation on the optical layer as long as it satisfies the required optical characteristics. For example, a transparent protective layer for protecting the polarizing film may be laminated on one or both surfaces of the polarizing film. On a surface of the transparent protective layer opposite to the surface bonded to the polarizing film or on one or both surfaces of the polarizing film itself, a hard-coat treatment, an antireflection treatment, surface treatments for anti-sticking, diffusion, anti-glaring, and the like may be performed, or alternatively, an alignment liquid crystal layer for viewing angle compensation or the like or a pressure-sensitive adhesive layer for helping the lamination of another film may be formed. A laminate of an optical film and a transparent protective layer is a polarizing plate. Examples of the polarizing plate include those including, as the optical layer, at least one optical film used for forming an image display apparatus etc., such as a polarization converter, a reflection plate, a semitransparent plate, a retardation plate (including a wavelength plate (λ plate) such as a half wavelength plate, a quarter wavelength plate, or the like), a viewing angle compensating film, a brightness enhancement film. In particular, examples of a preferable polarizing plate include: a reflective polarizing plate or a semi-transmission polarizing plate including a reflection plate or a semitransparent reflection plate laminated on the above-described polarizing plate as the laminate of the polarizing film and the transparent protective layer; an elliptically polarizing plate or a circularly polarizing plate including a retardation plate laminated on the above-described polarizing plate as the laminate of the polarizing film and the transparent protective layer; a wide-viewing-angle polarizing plate including a viewing angle compensating layer or a viewing angle compensating film laminated on the above-described polarizing plate as the laminate of the polarizing film and the transparent protective layer; and a polarizing plate including a brightness enhancement film laminated on the above-described polarizing plate as the laminate of the polarizing film and the transparent protective layer. Furthermore, the timing at which the optical layer or the optical film is laminated on a transparent protective layer may be either before or after the transparent protective layer is bonded to the polarizing film.

The transparent protective layer provided on one or both surfaces of the polarizing film preferably is formed of a material that is excellent in transparency, mechanical strength, thermal stability, moisture shielding property, isotropism, etc. Specific examples of the material include: polyester polymers such as polyethylene terephthalate and polyethylene naphthalate; cellulose polymers such as diacetyl cellulose and triacetyl cellulose; acrylic polymers such as polymethyl methacrylate; styrene polymers such as polystyrene and acrylonitrile-styrene copolymers (AS resins); and polycarbonate polymers. In addition, other examples of the polymer used for forming the transparent protective layer include: polyolefin polymers such as polyethylene, polypropylene, polyolefin having a cyclo or norbornene structure, and ethylene-propylene copolymers; vinyl chloride polymers; amide polymers such as nylon and aromatic polyamide; imide polymers; sulfone polymers; polyethersulfone polymers; polyetherether ketone polymers; polyphenylene sulfide polymers; vinyl alcohol polymers; vinylidene chloride polymers; vinyl butyral polymers; allylate polymers; polyoxymethylene polymers; epoxy polymers; and blends thereof. The transparent protective layer can be formed as a cured layer of a thermosetting resin or an ultraviolet-curing resin based on an acrylic substance, urethane, acrylic urethane, epoxy, silicone, etc. Among these, a triacetyl cellulose film having a surface saponified with alkali or the like and a polyolefin polymer film having a norbornene structure can be used preferably as a transparent protective layer to be bonded to the polarizing film according to the present invention.

Moreover, as the transparent protective layer, the polymer film described in JP 2001-343529 A (WO 01/37007) also can be used. For example, the film can be formed of a resin composition containing: (A) a thermoplastic resin whose side chain has a substituted and/or unsubstituted imido group; and (B) a thermoplastic resin whose side chain has a substituted and/or unsubstituted phenyl group and nitrile group. Specific examples include a film formed of a resin composition containing an alternating copolymer of isobutene and N-methyl maleimide and an acrylonitrile-styrene copolymer. The polymer film may be formed by extruding a mixture containing the resin composition.

The thickness of the transparent protective layer is not particularly limited, but generally is 500 μm or smaller, preferably 1 to 300 μm. In particular, the thickness of 5 to 200 μm is more preferable. Furthermore, it is preferable to saponify a surface of the transparent protective layer with alkali or the like in order to improve the polarization property, durability, and adhesiveness.

It is preferable that the transparent protective layer is as colorless as possible. Therefore, it is preferable to use a transparent protective layer whose retardation value in its thickness direction represented by $Rth=[(nx+ny)/2-nz] \cdot d$ (where nx and ny denote principal refraction indices within the film plane, nz denotes a refractive index in the film thickness direction, and d denotes the film thickness) is in the range from −90 nm to +75 nm. By using such a transparent protective layer, coloration (optical coloration) of the polarizing plate caused by the transparent protective layer can be solved almost completely. It is more preferable that Rth is −80 nm to +60 nm, and it is particularly preferable that Rth is −70 nm to +45 nm.

When the transparent protective layer is laminated on each of the surfaces of the polarizing film, the characteristics of the transparent protective layer on one surface may be different from those of the transparent protective layer on the other surface. Examples of the characteristics include, but are not limited to, the thickness, material, light transmittance, tensile modulus of elasticity, and the presence or absence of any optical layer.

The hard-coat treatment is intended to prevent the surface of the polarizing film or the polarizing plate as a laminate of the polarizing film and the transparent protective layer from being damaged. It can be carried out by, for instance, a method in which a cured film that is excellent in hardness and slide property is formed on the surface of the transparent protective layer using an appropriate ultraviolet-curing resin such as an acrylic resin or a silicone resin. The antireflection treatment is intended to prevent external light from being reflected by the surface of the polarizing plate. It can be achieved by the formation of, for instance, a conventionally known antireflection film. The anti-sticking treatment is intended to prevent adhesion to an adjacent layer.

The anti-glare treatment is intended to prevent visibility of light transmitted through the polarizing plate from being inhibited due to external light reflected by the surface of the polarizing plate. The anti-glare treatment can be carried out by providing the film surface with microscopic asperities according to an appropriate method such as, for example, roughening the film surface by sandblasting or embossing or by blending transparent fine particles into a film forming material. The fine particles to be used for forming microscopic asperities at the film surface can be transparent particles such as inorganic fine particles of silica, alumina, titania, zirconia, tin oxides, indium oxides, cadmium oxides, antimony oxides, etc. that have an average particle diameter of, for instance, 0.5 µm to 50 µm and may be conductive or organic fine particles of crosslinked or uncrosslinked polymers etc. When the microscopic asperities are provided at the film surface, the amount of fine particles to be used generally is about 2 to 70 parts by weight, preferably 5 to 50 parts by weight, with respect to 100 parts by weight of transparent resin used for forming the microscopic asperities. The antiglare layer also may serve as a diffusion layer (having a viewing angle widening function, etc.) for diffusing light transmitted through the polarizing plate and thereby widen the viewing angle, etc.

Note here that the optical layers such as the antireflection layer, the anti-sticking layer, the diffusion layer, and the antiglare layer can be formed on the transparent protective layer itself, or alternatively, these optical layers may be formed separately from the transparent protective layer.

When the polarizing film and the transparent protective layer are bonded to each other via an adhesive layer, the bonding treatment is not particularly limited. For example, it can be carried out by using an adhesive containing a vinyl polymer, or an adhesive containing at least boric acid or borax, glutaraldehyde or melamine, and a water-soluble crosslinking agent of a vinyl alcohol polymer such as oxalic acid. Such an adhesive layer can be formed by, for example, applying and drying an aqueous solution. When preparing the aqueous solution, other additives or a catalyst such as an acid can be blended, if necessary. In particular, when a polyvinyl alcohol-based polymer film is used as the polarizing film, an adhesive containing polyvinyl alcohol preferably is used in terms of adhesiveness.

A reflective polarizing plate is obtained by providing a reflecting layer on a polarizing plate and is used for forming a liquid crystal display that reflects incident light from the visible side (display side). The reflective polarizing plate is advantageous in that, for example, it allows the liquid crystal display to be thinned because the necessity of providing a light source such as backlight can be eliminated. The reflective polarizing plate can be formed in a suitable manner such as attaching a reflecting layer formed of a metal or the like on one surface of the polarizing plate, if necessary, via a transparent protective layer.

A specific example of the reflective polarizing plate is a reflective polarizing plate formed by providing, on one surface of a transparent protective layer that has been matted if required, a foil formed of a reflective metal such as aluminum or a deposition film to form a reflecting layer. Another example is a reflective polarizing plate that includes the above-mentioned transparent protective layer having a surface with microscopic asperities due to fine particles contained therein and a reflecting layer that is formed thereon and thus has a surface with microscopic asperities. The reflecting layer having a surface with microscopic asperities has an advantage in that it diffuses incident light by irregular reflection so that directivity and glare can be prevented and irregularity in color tones can be controlled. Also, the transparent protective layer containing fine particles has an advantage in that incident light and its reflected light are diffused when passing through this film, so that irregularity in color tones can be controlled further. The reflecting layer with a microscopic asperity structure corresponding to the microscopic asperities on the surface of the protective film can be formed by providing a metal directly on a surface of the transparent protective layer in any suitable methods including deposition and plating, such as vacuum deposition, ion plating, and sputtering. As mentioned above, the reflection plate can be formed directly on a transparent protective layer of the polarizing plate. Alternatively, a reflecting sheet or the like formed by providing a reflecting layer on a proper film corresponding to the transparent protective film can be used as the reflection plate. Since a typical reflecting layer is made of a metal, it is preferably used in a state that the reflecting surface of the reflecting layer is coated with a transparent protective layer, a polarizing plate, or the like, in order to prevent a reduction of the reflectance due to oxidation, and hence, to allow the initial reflectance to be maintained for a long period and to avoid the necessity of forming a protective layer separately.

A semi-transmission polarizing plate can be obtained by replacing the reflecting layer in the above-mentioned reflective polarizing plate with a semi-transmission reflecting layer (e.g., a half mirror) that reflects and transmits light. The semi-transmission polarizing plate usually is arranged on a backside of a liquid crystal cell to form a liquid crystal display of the type in which incident light from the visible side (display side) is reflected to display an image when the liquid crystal display is used in a relatively bright atmosphere, while in a relatively dark atmosphere, an image is displayed by using a built-in light source such as a backlight on the backside of the semitransparent polarizing plate. That is, the semitransparent polarizing plate is useful for forming a liquid crystal display that can save energy for a light source such as a backlight under a bright atmosphere, while a built-in light source can be used under a relatively bright atmosphere.

The following explanation is about an elliptically polarizing plate or a circularly polarizing plate formed by further laminating a retardation plate on a polarizing plate. The retardation plate is used for modifying linearly polarized light to either elliptically polarized light or circularly polarized light, modifying either elliptically polarized light or circularly polarized light to linearly polarized light, or modifying a polarization direction of linearly polarized light. In particular, a retardation plate called a quarter wavelength plate (also is referred to as a "λ/4 plate") is used for modifying linearly polarized light to circularly polarized light, and for modifying circularly polarized light to linearly polarized light. A half wavelength plate (also is referred to as a "λ/2 plate") is used in general for modifying a polarization direction of linearly polarized light.

The above-described elliptically polarizing plate is effective in compensating (preventing) colors (blue or yellow) generated due to birefringence in a liquid crystal layer of a super twist nematic (STN) liquid crystal display so as to provide a black-and-white display free of such colors. An elliptically polarizing plate with controlled three-dimensional refractive index is preferred further since it can compensate (prevent) colors that will be observed when looking at a screen of the liquid crystal display from an oblique direction. The circularly polarizing plate is effective in adjusting color tones of an image of a reflective liquid crystal display that has a color image display, and the polarizing plate serves to prevent reflection as well.

Examples of the retardation plate include: a birefringent film obtained by uniaxially or biaxially stretching a polymer material; an alignment film obtained by aligning a liquid crystal monomer and then crosslinking and polymerizing the liquid crystal monomer; an alignment film of a liquid crystal polymer; and a laminate of an alignment layer of a liquid crystal polymer and a film supporting the alignment layer. The stretching treatment can be, for example, roll stretching, stretching along a long slit, tenter stretching, tubular stretching, or the like. In the case of uniaxial stretching, the stretch ratio generally is in the range from about 1.1 to 3. The thickness of the retardation plate is not particularly limited, but generally is 10 to 200 µm, preferably 20 to 100 µm.

Examples of the polymer material include polyvinyl alcohol, polyvinyl butyral, poly methyl vinyl ether, polyhydroxyethyl acrylate, hydroxyethyl cellulose, hydroxypropyl cellulose, methyl cellulose, polycarbonate, polyalylate, polysulfone, polyethylene terephthalate, polyethylene naphthalate, polyethersulfone, polyphenylene sulfide, polyphenylene oxide, polyallylsulfone, polyvinyl alcohol, polyamide, polyimide, polyolefin, polyvinyl chloride, cellulose polymer, and various binary and ternary copolymers, graft copolymers, and blends thereof. These polymer materials are turned into aligned products (stretched films) by stretching or the like.

The liquid crystal monomer may have a lyotropic property or a thermotropic property, but the liquid crystal monomer having a thermotropic property is suitable in terms of workability. Examples of the liquid crystal monomer having a thermotropic property include those containing, as a basic skeleton, a biphenyl derivative, a phenyl benzoate derivative, a stilbene derivative, or the like to which a functional group such as an acryloyl group, a vinyl group, or an epoxy group is introduced. Preferably, such a liquid crystal monomer is aligned by a suitable known method such as, for example, a method using heat or light, a method of rubbing a surface of a substrate, or a method of adding an alignment aid. Then, with the thus-obtained alignment being maintained, the liquid crystal monomer is crosslinked and polymerized by light, heat, an electron beam, or the like, thereby fixing the alignment.

The liquid crystal polymer can be selected from various liquid crystal polymers such as principal-chain-type or side-chain-type liquid crystal polymers with a conjugate linear atomic group (mesogen) that imparts a liquid crystal alignment property being introduced to their principal chain or side chain, for example. Specific examples of the principal-chain-type liquid crystal polymer includes polyester liquid crystal polymers having, e.g., a nematic alignment property, discotic polymers, and cholesteric polymers, to which a mesogenic group is connected via a spacer portion that imparts flexibility. Specific examples of the side-chain-type liquid crystal polymer include those having, as a principal chain skeleton, polysiloxane, polyacrylate, polymethacrylate, or polymalonate and having, as a side chain, a mesogenic portion composed of a para-substituted cyclic compound unit that imparts a nematic alignment property via a conjugate atomic group as a spacer portion. These liquid crystal polymers can be obtained, for example, by spreading a liquid crystal polymer solution on a surface that has been treated so as to cause alignment, such as a rubbed surface of a thin film of polyimide, polyvinyl alcohol, or the like formed on a glass plate or a surface on which silicon oxide is oblique-deposited, and then heat-treating the solution.

The retardation plate may have a retardation suitable for an intended use, such as compensation of coloration caused by birefringence of various kinds of wavelength plates and liquid crystal layers and compensation of the viewing angle. The retardation plate may include two or more kinds of retardation plates to control optical characteristics such as retardation.

The elliptically polarizing plate and the reflective elliptically polarizing plate are prepared by suitably combining either a polarizing plate or a reflective polarizing plate with a retardation plate. Such an elliptically polarizing plate etc. can be formed by separately laminating a (reflective) polarizing plate and a retardation plate in a certain order in a process for manufacturing a liquid crystal display so as to combine a polarizing plate and a retardation plate. Alternatively, the elliptically polarizing plate etc. may be provided as an optical film in advance as described above. The elliptically polarizing plate etc. provided as an optical film in advance is excellent in quality stability, assembling operability, etc. Thus, there is an advantage in that efficiency in manufacturing a liquid crystal display can be improved.

The viewing angle compensating film is used, for example, for widening a viewing angle so that an image can be clear relatively when a screen of a liquid crystal display is viewed not in a direction perpendicular to the screen but in a slightly oblique direction. Such a viewing angle compensating retardation plate can be, for example, a retardation plate, an alignment film formed of a liquid crystal polymer, a transparent base having an alignment layer of a liquid crystal polymer supported thereon, etc. While an ordinary retardation plate is, for example, a birefringent polymer film that is stretched uniaxially in its in-plane direction, a retardation plate used as the viewing angle compensating film is, for example, a film stretched in two directions, such as a birefringent polymer film stretched biaxially in the in-plane direction and a birefringent polymer film and an obliquely-aligned film that are stretched uniaxially in the in-plane direction and also in the thickness direction so as to have a controlled refractive index in the thickness direction. The obliquely-aligned film is prepared, for example, by bonding a heat shrinkable film to a polymer film and stretching and/or shrinking the polymer film under an action of a shrinkage force provided by heating, or by obliquely aligning a liquid crystal polymer. Polymer materials similar to those used for forming the above-described retardation plate can be used for forming the retardation plate used as the viewing angle compensating film, and a suitable polymer is selected for preventing coloration caused by changes in a visible angle based on retardation in a liquid crystal cell or for widening a viewing angle to achieve preferable visibility.

From an aspect of achieving a wide viewing angle with excellent visibility, it is preferable to use an optically compensating retardation plate prepared by supporting an optically anisotropic layer containing an alignment layer of a liquid crystal polymer, and particularly containing an obliquely-aligned layer of a discotic liquid crystal polymer, with a triacetylcellulose film.

As a polarization converter, an anisotropic reflective polarizer, an anisotropic light-scattering polarizer, etc. can be used, for example. Preferable examples of the anisotropic reflective polarizer include: a composite of a cholesteric liquid crystal layer that reflects either counterclockwise or clockwise circularly-polarized light while transmitting other light, such as, in particular, an alignment film of a cholesteric liquid crystal polymer or a film including the alignment liquid crystal layer supported on a film base, and a retardation plate having a retardation 0.25 times as large as any wavelength in the reflection band; and an anisotropic reflective polarizer that transmits linearly polarized light of a predetermined polarization axis while reflecting other light, such as a multilayer dielectric thin film or a multilayer laminate of thin films different in refractive anisotropy. Examples of the former include PCF series manufactured by Nitto Denko Corporation, and examples of the latter include DBEF series manufactured by 3M Co. Furthermore, as the anisotropic reflective polarizer, a reflective grid polarizer also can be used preferably. Specific examples thereof include Micro Wires manufactured by Moxtek, Ink. On the other hand, as the anisotropic light-scattering polarizer, DRPF or the like manufactured by 3M Co., can be used, for example.

A polarizing plate obtained by attaching a brightness enhancement film to a polarizing plate is arranged on a backside of a liquid crystal cell in use. When natural light enters the brightness enhancement film by reflection from a backlight or the backside of a liquid crystal display etc., the brightness enhancement film reflects linearly polarized light of a predetermined polarizing axis or circularly polarized light in a predetermined direction while transmitting other light. Thus, the polarizing plate as the laminate of the brightness enhancement film and the polarizing plate allows entrance of light from a light source such as a backlight so as to obtain transmitted light in a predetermined polarization state, while reflecting light other than the light in the predetermined polarization state. Light that is reflected at this brightness enhancement film is reversed through a reflecting layer or the like arranged additionally behind the brightness enhancement film. The reversed light that re-enters the brightness enhancement film is transmitted partly or entirely as light in a predetermined polarization state, so that light transmitting the brightness enhancement film is increased and polarized light that is hardly absorbed in the polarizing film is supplied. As a result, quantity of light available for the liquid crystal display etc. can be increased to enhance brightness.

A diffusion plate can also be provided between the brightness enhancement film and the reflecting layer or the like. Polarized light reflected by the brightness enhancement film is directed to the reflecting layer or the like. The diffusion plate diffuses the passing light uniformly and at the same time, it cancels the polarization so as to provide a depolarized state. Namely, the diffusion plate converts the light back into its original state as natural light. This depolarized light, i.e., natural light is directed to the reflecting layer or the like, reflected at the reflecting layer or the like, and it passes again the diffusion plate so as to re-enter the brightness enhancement film. The state of natural light is recovered by repeating this series of actions. Thereby, the diffusion plate serves to maintain brightness of the display screen and decrease irregularity in the brightness. That is, a display screen having uniform brightness can be obtained by providing a diffusion plate for recovering natural light, since the diffusion plate has a diffusion function and further it can increase appropriately the repeated reflection of the initial incident light.

The brightness enhancement film can be selected as appropriate from films that transmit linearly polarized light of a predetermined polarization axis while reflecting other light, such as a dielectric multilayer thin film and a multilayer laminate of thin films different in refractive anisotropy, and films that reflects either counterclockwise or clockwise circularly-polarized light while transmitting other light, such as an alignment film of a cholesteric liquid crystal polymer or a film including the alignment liquid crystal layer supported on a film base.

When the cholesteric liquid crystal layer is formed so as to include two or more layers different in reflection wavelength, the cholesteric liquid crystal layer can reflect circularly polarized light in a wide wavelength range including a visible light region, and this can provide circularly polarized transmitted light in a wide wavelength range.

In the present invention, a polarizing plate may be formed by laminating the polarizing plate and two or more optical layers, as the polarization separation polarizing plate described above. Thus, the polarizing plate may be a reflective elliptically polarizing plate or a semi-transmission elliptically polarizing plate prepared by combining either the above-mentioned reflective polarizing plate or semi-transmission polarizing plate with a retardation plate.

An optical film as a laminate of the optical layers and the polarizing plate can be formed by laminating them separately in a certain order in a process of producing a liquid crystal display or the like. However, since an optical film obtained by laminating them in advance has excellent quality stability, assembling operability, etc., there is an advantage in that efficiency in manufacturing a liquid crystal display can be improved. Any suitable bonding means such as a pressure-sensitive adhesive layer can be used for lamination. When bonding the polarizing plate and any other optical films, the optical axes can be arranged with appropriate angles corresponding to the desired retardation properties or the like.

The polarizing film according to the present invention and the optical element as a laminate including the polarizing film as described above may be provided with a pressure-sensitive adhesive layer or the like for adhesion to another member such as a liquid crystal cell. Such a pressure-sensitive adhesive layer is not particularly limited, and can be formed of a suitable pressure-sensitive adhesive selected from conventionally-known pressure-sensitive adhesives based on acrylic substances, silicone, polyester, polyurethane, polyether, and rubber, for example. In particular, a pressure-sensitive adhesive layer having a low moisture absorption coefficient and an excellent thermal resistance is preferable from the aspects of prevention of foaming or peeling caused by moisture absorption, prevention of degradation in the optical characteristics and warping of a liquid crystal cell caused by difference in thermal expansion coefficient, a capability of forming a liquid crystal display with high quality and excellent durability, and the like. Moreover, in order to prevent optical characteristics of the polarizing film and the like from changing, preferable pressure-sensitive adhesives are those that do not require a process at high temperature when hardening or drying it or a long period for a hardening or drying treatment. From the above-described viewpoints, acrylic pressure-sensitive adhesives are used preferably in the present invention.

Also, it is possible to incorporate fine particles so as to form a pressure-sensitive adhesive layer exhibiting a light diffusion property. The pressure-sensitive adhesive layer can be formed on any appropriate surfaces as required. For example, in the case of a polarizing plate including a polarizing film of the present invention and a transparent protective layer, the pressure-sensitive adhesive layer can be formed on one or both surfaces of the protective layer.

The thickness of the pressure-sensitive adhesive layer is not particularly limited, but it preferably is in the range from 5 to 35 µm, more preferably from 15 to 25 µm. When the thickness of the pressure-sensitive adhesive layer is within the above-described range, a stress caused by the variation in size of the polarizing film and polarizing plate can be relieved.

In the case where a surface of the pressure-sensitive adhesive layer is exposed, it is preferable to cover the surface with a separator tentatively so as to prevent contamination until the pressure-sensitive adhesive layer is put to use. The separator can be made of a suitable film corresponding to the above-mentioned transparent protective layer etc., coated with a suitable peeling agent if required. The peeling agent may be selected, for example, from a silicone-based agent, a long-chain alkyl-based agent, a fluorine-based agent, an agent containing molybdenum sulfide, and the like.

The respective layers such as the transparent protective layer, the optical layer, and the adhesive layer for forming the above-described polarizing plate or the optical members may be subjected to a suitable treatment such as a treatment with an UV absorber, e.g., salicylate ester compounds, benzophenone compounds, benzotriazole compounds, cyanoacrylate compounds, or nickel complex salt-based compounds, thus providing an UV absorbing capability.

The polarizing film according to the present invention can be used preferably in an image display apparatus such as a liquid crystal display, an electroluminescence (EL) display, a plasma display (PD), and a field emission display (FED).

The polarizing film according to the present invention can be used preferably for forming various apparatuses such as liquid crystal displays. For example, the polarizing film or polarizing plate can be arranged on at least one surface of a liquid crystal cell so as to be applied to, for example, a reflection-type, semi-transmission-type, or transmission and reflection type liquid crystal display. The liquid crystal cell substrate may be either a plastic substrate or a glass substrate. A liquid crystal cell to compose the liquid crystal display can be selected arbitrarily. For example, it is possible to use liquid crystal cells of appropriate types such as active matrix driving type represented by a thin film transistor type, a simple matrix driving type represented by a twist nematic type and a super twist nematic type.

When polarizing plates or optical members are arranged on both sides of a liquid crystal cell, the polarizing plates or the optical members on the surfaces can be the same or different type. Moreover, for forming a liquid crystal display, one or more layers of appropriate members such as a prism array sheet, a lens array sheet, an optical diffuser, and a backlight can be arranged at proper positions.

Now, an organic electroluminescence display (an organic EL display) will be described. In general, an organic EL display has a luminant (organic electroluminescence luminant) that is prepared by laminating a transparent electrode, an organic luminant layer, and a metal electrode in a certain order on a transparent substrate. Here, the organic ruminant layer is a laminate of various organic thin films. Known examples of the combination thereof include: a laminate of a hole injection layer made of a triphenylamine derivative or the like and a luminant layer made of a phosphorous organic solid such as anthracene; a laminate of the ruminant layer and an electron injection layer made of a perylene derivative or the like; and a laminate of the hole injection layer, the ruminant layer, and the electron injection layer.

In an organic EL display configured as described above, the organic luminant layer is made of a film that is extremely thin such as about 10 nm. Therefore, the organic luminant layer transmits light approximately completely as the transparent electrode does. As a result, when the layer does not illuminate, a light beam entering from the surface of the transparent substrate passes through the transparent electrode and the organic ruminant layer and is reflected at the metal electrode so that it comes out again to the surface of the transparent substrate. Thereby, the display surface of the organic EL display looks like a mirror when viewed from the outside.

In the organic EL display including the organic EL luminant, configured so that it includes the transparent electrode on the front surface side and the metal electrode on the back surface side of the organic ruminant layer that emits light by application of voltage, a polarizing film can be provided on the front surface side of the transparent electrode and a retardation film can be provided between the transparent electrode and the polarizing plate.

The retardation film and the polarizing film have a function of polarizing light that enters from outside and is reflected by the metal electrode. The polarizing function is effective in preventing the mirror surface of the metal electrode from being visually recognized from the outside. In particular, by forming the retardation film with a quarter wavelength plate and adjusting an angle formed by the polarization directions of the retardation plate and the polarizing plate to be $\pi/4$, the mirror surface of the metal electrode can be blocked completely.

In the field of image display apparatuses as described above, in-house manufacturing that continuously performs the steps of punching out pieces from a raw optical film, screening the pieces, and bonding the pieces has been required for cost reduction. In the in-house manufacturing method that performs continuous manufacturing from a post-processing (cutting) of an optical film and bonding of the optical film to a cell, it is necessary to measure a defective area of the optical film immediately. In the present invention, when a polarizing plate that has been cut is used in a display as it is, the size of the chip-cut polarizing film can be determined arbitrarily, but generally is 10 to 130 cm×10 to 130 cm. Although there is no upper limit on the size of the display, the size of the display depends on the width of a currently realized base of a polarizing film, such as a transparent protective film or a PVA film. Conventionally, inspection needs to be performed after chip-cutting so as to eliminate defective products. However, according to the present invention, since the in-plane uniformity of the polarizing film is improved, the necessity of performing the inspection after the chip-cutting and also the necessity of performing processes such as delivery, packing, and unpacking required for the inspection can be eliminated, so that the step of bonding the polarizing film to an image display element such as a liquid crystal display element or an EL display element can be performed in a single line.

The type of the image display apparatus of the present invention is not particularly limited, and can be, for example, a liquid crystal display, an EL display, PD, FED, etc. as described above. Among these, a liquid crystal display is preferable.

In the following, the present invention will be described more specifically by way of Examples and Comparative Examples. It is to be noted, however, the present invention is by no means limited to Examples and Comparative Examples below.

Example 1

A polyvinyl alcohol (PVA) film (Kuraray Co., Ltd., polarization degree: 2400) having a thickness of 75 µm and an initial raw film width (W) of 2500 mm was subjected to swelling, dyeing, crosslinking, stretching, washing, and drying treatment steps. Thus a 28 µm thick polarizing film was obtained.

The above-described respective treatment steps were performed under the following conditions.

(Swelling Treatment Step)

The film was stretched to 2.5 times in pure water at 30° C.

(Dyeing Treatment Step)

In a 0.05 wt % iodine aqueous solution (I/KI (weight ratio)=1/10), the film was dyed at 30° C. for 60 seconds, during which the film was stretched so that the total stretch ratio would be 2.8.

(Crosslinking Treatment Step)

The film was immersed in an aqueous solution (40° C.) containing 3 wt % of boric acid and 2 wt % of KI for 30 seconds, during which the film was stretched so that the total stretch ratio would be 3.0.

(Stretching Treatment Step)

The film was stretched in an aqueous solution (60° C.) containing 4 wt % of boric acid and 3 wt % of KI so that the total stretch ratio would be 5.8.

(Washing Treatment Step)

The film was immersed in a 5 wt % KI aqueous solution (25° C.) for 30 seconds.

(Drying Treatment Step)

The film was dried at 40° C. for 1 minute with a tensile force being applied thereto, using a drying apparatus in which there were two pairs of adjacent rolls and the distances (R) therebetween were both 1250 mm.

With regard to the thus-obtained polarizing film, the single transmittance, the polarization degree, the crossed Δab value, and the standard deviation of the crossed transmittance in the width direction at a measurement wavelength of 440 nm were measured. The results of these measurements are shown in Table 1 below. The above-described respective characteristics were measured according to methods that will be described later (this applies to other Examples and Comparative Examples).

Example 2

A polarizing film was produced in the same manner as in Example 1, except that, in the drying treatment step of Example 1, a drying apparatus in which there were two pairs of adjacent rolls and the distances (R) therebetween were both 1500 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Example 3

A polarizing film was produced in the same manner as in Example 1, except that, in the drying treatment step of Example 1, a drying apparatus in which there were two pairs of adjacent rolls and the distances (R) therebetween were both 2500 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Example 4

A polarizing film was produced in the same manner as in Example 1, except that, in the drying treatment step of Example 1, a drying apparatus in which there were five pairs of adjacent rolls and the distances (R) therebetween were all 5000 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Example 5

A polarizing film was produced in the same manner as in Example 1, except that, in the drying treatment step of Example 1, a drying apparatus in which there were five pairs of adjacent rolls and the distances (R) therebetween were all 7500 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Example 6

A polarizing film was produced in the same manner as in Example 1, except that, in the drying treatment step of Example 1, a drying apparatus in which there were five pairs of adjacent rolls and the distances (R) therebetween were all 9500 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Comparative Example 1

A polarizing film was produced in the same manner as in Example 1, except that, in the drying treatment step of Example 1, a drying apparatus in which there were two pairs of adjacent rolls and the distances (R) therebetween were both 750 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Comparative Example 2

A polarizing film was produced in the same manner as in Example 1, except that, in the drying treatment step of Example 1, a drying apparatus in which there were two pairs of adjacent rolls and the distances (R) therebetween were both 1000 mm was used. With regard to the thus-obtained polarizing film, the single transmittance, the polarization degree, the crossed Δab value, and the standard deviation of the crossed transmittance in the width direction at a measurement wavelength of 440 nm were measured. The results of the measurements are shown in Table 1 below.

Comparative Example 3

A polarizing film was produced in the same manner as in Example 1, except that, in the drying treatment step of Example 1, a drying apparatus in which there were five pairs of adjacent rolls and the distances (R) therebetween were all 11250 mm was used. However, during the drying treatment, the slack was caused in the film so that conveying the film became impossible. Thus, a polarizing film was not obtained.

(Method of Measuring Optical Characteristics (Single Transmittance, Polarization Degree, and Crossed Δab Value))

The polarizing film obtained in each of Examples and Comparative examples was cut along a direction forming an angle of 45° with respect to the stretching direction so as to obtain a cut piece with a size of 50 mm×25 mm. The single transmittance, the parallel transmittance ($H_0$), and the crossed transmittance ($H_{90}$) of the cut piece were measured using a spectrophotometer (Murakami Color Research Laboratory: DOT-3), and the polarization degree was determined by substituting these values into the following expression. Note here that these transmittances are Y values obtained by correcting their luminous factor in view of two-degrees-visual field (C light source) according to JIS Z 8701.

$$\text{Polarization degree (\%)} = \{(H_0 - H_{90})/(H_0 + H_{90})\}^{1/2} \times 100$$

The crossed hue a value (a) and crossed hue b value (b) were measured in a similar manner, and the crossed Δab value was determined by substituting these values into the following expression.

$$\text{Crossed } \Delta ab \text{ value} = \sqrt{(\sqrt{a} + \sqrt{b})}$$

The polarizing film is more neutral as this value is closer to 0. Thus, in practice, it is preferable that this value is 2.5 or less, more preferably 1.8 or less.

(Method of Measuring Standard Deviation of Crossed Transmittance in the Width Direction)

In each of the polarizing films obtained in Examples and Comparative Examples, every 50 mm measured in the width direction from one end of the film in the width direction, two samples (each having a size of 50 mm×50 mm) adjacent to each other in the film conveying direction were cut out. These two samples were arranged in a crossed Nicols state. In this state, the crossed transmittance of each sample was measured. The crossed transmittance was measured using a spectrophotometer (Murakami Color Research Laboratory: Dot-3C) at a measurement wavelength of 440 nm. Based on the measured values, the standard deviation was calculated. In Examples and Comparative examples, the standard deviation was determined using the measured values obtained at twenty points with regard to each sample.

TABLE 1

| | In drying apparatus | | | | | | Standard |
|---|---|---|---|---|---|---|---|
| | Distance between rolls (R) [mm] | Initial raw film width | R/W [-] | Single transmittance [%] | Polarization degree [%] | Crossed Δab value [-] | deviation in width direction [-] |
| Ex. 1 | 1250 | 2500 | 0.5 | 44.0 | 99.91 | 2.2 | 0.0028 |
| Ex. 2 | 1500 | 2500 | 0.6 | 44.0 | 99.94 | 2.0 | 0.0026 |
| Ex. 3 | 2500 | 2500 | 1.0 | 44.0 | 99.95 | 1.5 | 0.0024 |
| Ex. 4 | 5000 | 2500 | 2.0 | 44.0 | 99.96 | 1.2 | 0.0020 |
| Ex. 5 | 7500 | 2500 | 3.0 | 44.0 | 99.97 | 1.0 | 0.0017 |
| Ex. 6 | 9500 | 2500 | 3.8 | 44.0 | 99.97 | 0.7 | 0.0015 |
| Comp. Ex. 1 | 750 | 2500 | 0.3 | 44.0 | 99.84 | 3.5 | 0.0045 |
| Comp. Ex. 2 | 1000 | 2500 | 0.4 | 44.0 | 99.82 | 2.8 | 0.0035 |
| Comp. Ex. 3 | 11250 | 2500 | 4.5 | — | — | — | — |

As apparent from the results shown in Table 1 above, in the polarizing films obtained in Examples where the value of R/W during the drying treatment was set to be not less than 0.5 and not more than 4.0, optical characteristics were improved as can be seen from the polarization degree and the crossed Δab value, and the in-plane uniformity also was improved as can be seen from the data regarding the variation in the width direction.

INDUSTRIAL APPLICABILITY

According to a method for manufacturing a polarizing film according to the present invention, even when a wide raw film is used, it is possible to obtain a polarizing film that achieves excellent optical characteristics as well as uniformity in in-plane optical characteristics. Therefore, the polarizing film obtained by the manufacturing method of the present invention can preferably used in, for example, an image display apparatus such as a liquid crystal display, an EL display, a PD, a FED, or the like, though there is no limitation on the use of the polarizing film.

The invention claimed is:

1. A method for manufacturing a polarizing film, the method comprising the steps of:
   dyeing a polyvinyl alcohol film;
   stretching the dyed film with a wet stretching method; and
   drying the film that has undergone the dyeing and stretching steps while conveying the film with rolls,
   wherein, in the drying step, at least two rolls are used as the rolls and the film is dried under a condition that a ratio (R/W) of a distance (R) between the adjacent rolls to an initial width (W) of the film is not less than 1.0 and not more than 4.0.

2. The method according to claim 1, wherein, in the drying step, three or more rolls are used as the rolls, and said condition is satisfied where the distance (R) denotes a distance between at least one pair of the adjacent rolls selected from the three or more rolls.

3. The method according to claim 1, wherein, in the drying step, at least 50% of the film is dried under said condition.

4. The method according to claim 1, wherein, in the drying step, the film is conveyed with a tensile force being applied to the film.

5. The method according to claim 1, wherein, in the drying step, the film is conveyed with a tensile force of that causes the film to be stretched about 1.0 to 1.3 times.

6. The method according to claim 1, wherein the R/W ratio is not less than 1.0 and not more than 3.8.

7. The method according to claim 1, wherein method manufactures a polarizing film having a standard deviation of less than 0.06 in the width direction.

* * * * *